US008644546B2

(12) United States Patent
Conwell

(10) Patent No.: US 8,644,546 B2
(45) Date of Patent: Feb. 4, 2014

(54) METHOD AND SYSTEMS FOR PROCESSING TEXT FOUND IN IMAGES

(75) Inventor: William Y. Conwell, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 1051 days.

(21) Appl. No.: 12/691,608

(22) Filed: Jan. 21, 2010

(65) Prior Publication Data

US 2011/0019869 A1 Jan. 27, 2011

Related U.S. Application Data

(63) Continuation of application No. 09/670,113, filed on Sep. 26, 2000, now Pat. No. 7,657,064.

(51) Int. Cl.
G06K 9/00 (2006.01)

(52) U.S. Cl.
USPC ........................... 382/100; 382/112; 382/306

(58) Field of Classification Search
USPC .......................................... 382/100, 112, 306
See application file for complete search history.

(56) References Cited

U.S. PATENT DOCUMENTS

| | | | |
|---|---|---|---|
| 4,908,873 A | 3/1990 | Philibert et al. | |
| 5,257,119 A | 10/1993 | Funada et al. | |
| 5,506,697 A | 4/1996 | Li et al. | |
| 5,678,155 A | 10/1997 | Miyaza | |
| 5,729,471 A | 3/1998 | Jain et al. | |
| 5,761,686 A | 6/1998 | Bloomberg | |
| 5,765,176 A | 6/1998 | Bloomberg | |
| 5,829,895 A * | 11/1998 | Hayashi et al. | 400/124.05 |
| 5,841,886 A | 11/1998 | Rhoads | |
| 5,978,477 A | 11/1999 | Hull et al. | |
| 5,995,978 A | 11/1999 | Cullen et al. | |
| 6,024,287 A | 2/2000 | Takai et al. | |
| 6,067,553 A | 5/2000 | Downs et al. | |
| 6,101,274 A | 8/2000 | Pizano et al. | |
| 6,182,090 B1 | 1/2001 | Peairs | |
| 6,192,138 B1 | 2/2001 | Yamadaji | |
| 6,243,480 B1 | 6/2001 | Zhao et al. | |
| 6,243,481 B1 | 6/2001 | Tao | |
| 6,286,036 B1 | 9/2001 | Rhoads | |
| 6,311,214 B1 | 10/2001 | Rhoads | |
| 6,321,981 B1 | 11/2001 | Ray et al. | |
| 6,325,420 B1 | 12/2001 | Zhang et al. | |
| 6,334,721 B1 | 1/2002 | Horigane | |
| 6,351,815 B1 * | 2/2002 | Adams ............................. 726/32 |
| 6,370,258 B1 * | 4/2002 | Uchida ........................ 382/100 |
| 6,373,960 B1 | 4/2002 | Conover et al. | |
| 6,389,151 B1 | 5/2002 | Carr et al. | |
| 6,484,933 B1 | 11/2002 | Zimmerman et al. | |
| 6,553,129 B1 | 4/2003 | Rhoads | |
| 6,553,131 B1 | 4/2003 | Neubauer et al. | |
| 6,577,746 B1 | 6/2003 | Evans et al. | |
| 6,587,586 B1 | 7/2003 | Cui et al. | |
| 6,590,997 B2 | 7/2003 | Rhoads | |
| 6,608,930 B1 | 8/2003 | Agnihotri et al. | |
| 6,614,914 B1 | 9/2003 | Rhoads et al. | |
| 6,614,915 B2 | 9/2003 | Powell et al. | |
| 6,647,128 B1 | 11/2003 | Rhoads | |
| 6,681,028 B2 | 1/2004 | Rodriguez et al. | |
| 6,747,687 B1 | 6/2004 | Alves | |
| 6,799,302 B1 | 9/2004 | Sites | |
| 6,801,999 B1 | 10/2004 | Venkatesan et al. | |
| 6,963,884 B1 | 11/2005 | Levy | |
| 7,657,064 B1 | 2/2010 | Conwell | |
| 2002/0027994 A1 | 3/2002 | Katayama et al. | |
| 2002/0046171 A1 | 4/2002 | Hoshino | |
| 2004/0015362 A1 | 1/2004 | Rhoads | |

FOREIGN PATENT DOCUMENTS

| | | |
|---|---|---|
| EP | 493091 | 7/1992 |
| EP | 936531 A2 * | 8/1999 |
| JP | 08-050598 | 2/1996 |
| WO | WO 0211446 | 2/2002 |

OTHER PUBLICATIONS

Bloomberg, "Embedding Digital Data on Paper in Iconic Text" SPIE vol. 3027, Document Recognition IV, pp. 67-80 (1997).
Johnson, et al., "Bridging the Paper and Electronic Worlds: The Paper User Interface", Interchi '93, pp. 507-512, Apr. 1993.
Lopresti et al., "Locating and Recognizing Text in WWW Image", Dec. 30, 1999, Information Retrieval, col. 2, No. 2-3,pp. 177-206.
Newman, William, et al. A Desk Supporting Computer-Based Interaction with Paper Documents, ACM Conference on Human Factors in Computing Systems (CHI '92) May 3-7, 1992, pp. 587-592.
Peairs, "Iconic Paper," Proceedings of the Third International Conference on Document Analysis and Recognition (ICDAR '95), pp. 1174-1179, 1995.
Shim et al., "Automatic Text Extraction from Video for Content-Based Annotation and Retrieval," Pattern recognition, IEEE, Aug. 16-20, 1998, pp. 618-620.
Swain Michael, "Searching for Multimedia on the World Wide Web," 1999, IEEE, pp. 32-37.
Whittaker, et al., "Back to the Future: Pen and Paper Technology Supports Complex Group Coordination," CHI '95, Conference on Human Factors in Computing Systems, Denver, Colorado (May 7-11, 1995).
Zhao, "A. WWW Service to Embed and Prove Digital Copyright Watermarks," Fraunhofer Institute for Computer Graphics, Proc. Of EU Conf. on Multimedia Applications, Services and Techniques, May 1996, 15 pages.
Notice of Allowance on U.S. Appl. 09/670,113, mailed Sep. 23, 2009.
Final Office Action on U.S. Appl. No. 09/670,113, mailed Nov. 15, 2005.
Non-Final Office Action on U.S. Appl. No. 09/670,113, mailed Jul. 15, 2004.
Ex-Parte Quayle on U.S. Appl. No. 09/670,113, mailed May 5, 2004.
Non-Final Office Action on U.S. Appl. No. 09/670,113, mailed Aug. 1, 2003.

* cited by examiner

Primary Examiner — Wesley Tucker

(57) ABSTRACT

An image containing text (e.g., a surveillance camera photo that includes a vehicle license plate) is analyzed to determine the text (e.g., by an OCR technique). The recognized text is then stored in a database. The image is digitally watermarked with an identifier that associates the image with the database location where the text is stored. In addition to surveillance contexts, this technology can be employed in indexing the World Wide Web. Images used in web pages can be watermarked to link to associated text or other data. When the web page is crawled by an indexer, the watermark can be decoded and the associated data repository accessed to obtain information that can augment the web index for that page.

18 Claims, No Drawings

METHOD AND SYSTEMS FOR PROCESSING TEXT FOUND IN IMAGES

RELATED APPLICATION DATA

This application is a continuation of application Ser. No. 09/670,113, filed Sep. 26, 2000 (now U.S. Pat. No. 7,657,064), the disclosure of which is incorporated herein by reference.

DESCRIPTION

The World Wide Web is a distributed database including hundreds of millions of documents. Search engines such as Alta Vista attempt to index the web based on ASCII text included on each page and on associated meta tags. Increasingly, however, text information is present on the Web in the form of text images. Known search engines are unable to make use of text presented in this form.

One approach to this problem is discussed in Lopresti et al, "Locating and Recognizing Text in WWW Images," Information Retrieval, vol. 2, no. 2-3 p. 177-206, 2000, and involves a procedure based on clustering in color space followed by a connected-components analysis. Character recognition is performed using polynomial surface fitting and "fuzzy" n-tuple classifiers. While suitable for some applications, such techniques are too computationally intensive and imprecise for widespread use.

In accordance with one embodiment of the present invention, an image containing text is digitally watermarked with an identifier. The identifier serves as an index to a database record where additional information about the image, including keywords or full text of the included text, are provided. To obtain the associated data, a search engine web crawler or other process can download an image, apply a watermarking detection procedure, use an identifier thereby obtained to index a database, and access keywords or full text represented in the image from the indexed database record.

The text can be entered in the database using various known methods. One is to have the text manually coded by a clerical service. Another is to apply an automated OCR process to the image data, such as that detailed by Lopresti. Once the text is once thereby developed, it can be made quickly available repeatedly thereafter by reference to the associated database record.

The database can be conventional, and is preferably accessible over the internet. A suitable database system is disclosed in application Ser. No. 09/571,422, filed May 15, 2000 (now U.S. Pat. No. 6,947,571). A variety of watermarking techniques are known. An illustrative set of techniques that can be employed in this application is disclosed in application Ser. No. 09/503,881, filed Feb. 14, 2000 (now U.S. Pat. No. 6,614,914). The disclosures of these applications are incorporated herein by reference.

The technology disclosed herein finds myriad applications. As noted, one is in the indexing of a collection of electronic documents (e.g., web pages). An index augmented by the results of such a procedure is generally more useful than such an index without augmentation.

Another application is in the use of webcams, or security monitoring cameras. Certain image frames from such sources (e.g., one every minute, or one every second, etc.) can be analyzed for textual information (e.g., license plate markings, superimposed date data), and the textual information stored. The image data is watermarked, with the watermark indicating the repository of the corresponding textual information.

Still another application is PDF documents or fax data files. (While some PDF files include corresponding ASCII text data, most do not.) The file data can be applied to an OCR engine, and the resulting text stored in a database. The PDF or fax data file can be slightly altered to impart a watermark—the watermark again serving to point to the repository of the corresponding text information.

Yet another application is in photocopiers. Again, the textual content is extracted from the scanned image of the original document. In this case the paper photocopy output (or a corresponding digital file) is altered in slight respects to encode a watermark. The watermark points to the text data repository.

While the illustrative embodiment particularly considered watermarks that convey an index to a remote database, other arrangements are naturally possible. For example, the watermark can directly encode the fulltext or keywords (forms of metadata).

Similarly, while the illustrative embodiment particularly considered imaged text in image files, the same principles can be applied more widely. For example, all metadata associated with an image through a watermark can be employed in compiling an index of the web or other collection of content data—not just included text (e.g., names of persons and places, dates, times, and other more application-specific metadata). Moreover, such techniques are not just limited to images. Other forms of content, including video and audio, can be watermarked, and the metadata thereby associated with the content can be used for web indexing and other purposes.

I claim:

1. A method comprising:
receiving data corresponding to an image, wherein the image includes a depiction of text;
recognizing at least some of the depicted text; and
steganographically encoding a digital watermark in the image, wherein the steganographically encoded digital watermark associates the image with the recognized text, wherein the watermark comprises a visually imperceptible carrier of an identifier, and wherein the identifier comprises an index to a record of a database that includes additional information related to the image.

2. The method of claim 1, wherein recognizing at least some of the depicted text comprises recognizing at least some of the depicted text by an automated OCR process.

3. The method of claim 1, further comprising storing the recognized text in the database.

4. The method of claim 1, wherein the digital watermark directly encodes at least a portion of the recognized text in the image.

5. The method of claim 1, wherein encoding the digital watermark in the image occurs after recognizing at least some of the depicted text.

6. A system comprising:
a scanner configured to produce scan data corresponding to an original document;
an OCR engine configured to recognize text from the scan data; and
a watermarker configured to alter the scan data to steganographically encode a digital watermark in the scan data, wherein the watermark associates the scan data with the recognized text, wherein the watermark comprises a visually imperceptible carrier of an identifier, and wherein the identifier comprises an index to a record of a database that includes additional information related to the scan data.

7. The system of claim 6, wherein the scan data represents a hardcopy page, and wherein the watermark further comprises a pointer to a memory location in which the recognized text is stored.

8. The system of claim 6, wherein the scan data represents a hardcopy page, and wherein the watermark directly encodes at least a portion of said recognized text in the scan data.

9. The method of claim 1, wherein the additional information related to the image comprises a keyword related to the image.

10. The method of claim 1, wherein the additional information related to the image comprises all of the depicted text.

11. The method of claim 1, wherein the additional information related to the image comprises full text of the depicted text.

12. The system of claim 6, wherein the additional information related to the image comprises a keyword related to the image.

13. The system of claim 6, wherein the additional information related to the image comprises all of the depicted text.

14. The system of claim 6, further comprising the database that includes the additional information related to the scan data.

15. A non-transitory computer-readable medium having instructions stored thereon, that when executed by a computing device cause the computing device to perform operations comprising:
  receiving data corresponding to an image, wherein the image includes a depiction of text;
  recognizing at least some of the depicted text; and
  steganographically encoding a digital watermark in the image, wherein the steganographically encoded digital watermark associates the image with the recognized text, wherein the watermark comprises a visually imperceptible carrier of an identifier, and wherein the identifier comprises an index to a record of a database that includes additional information related to the image.

16. The non-transitory computer-readable medium of claim 15, wherein recognizing at least some of the depicted text comprises recognizing at least some of the depicted text by an automated OCR process.

17. The non-transitory computer-readable medium of claim 15, wherein the digital watermark directly encodes at least a portion of the recognized text in the image.

18. The non-transitory computer-readable medium of claim 15, wherein the additional information related to the image comprises a keyword related to the image.

* * * * *